(12) United States Patent
Kamgar et al.

(10) Patent No.: US 6,205,167 B1
(45) Date of Patent: Mar. 20, 2001

(54) APPARATUS AND METHOD FOR CODE TRACKING IN AN IS-95 SPREAD SPECTRUM COMMUNICATIONS SYSTEM

(75) Inventors: Farbod Kamgar, Campbell; Mariam Motamed, San Francisco; Antoine Jean Rouphael, Tracy, all of CA (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 08/996,668

(22) Filed: Dec. 23, 1997

(51) Int. Cl.[7] .................................................. H04L 27/30
(52) U.S. Cl. ......................... 375/134; 375/133; 375/140; 375/142; 375/150
(58) Field of Search ................................. 375/367, 133, 375/134, 142, 140, 150; 370/320; 331/8; 348/403

(56) References Cited

U.S. PATENT DOCUMENTS

| | | | |
|---|---|---|---|
| 4,221,005 | * 9/1980 | La Flame | 375/367 |
| 4,570,130 | * 2/1986 | Grindel et al. | 331/8 |
| 4,961,160 | * 10/1990 | Sato et al. | 708/301 |
| 5,764,630 | * 6/1998 | Natali et al. | 370/320 |
| 5,870,144 | * 2/1999 | Guerrera | 348/403 |

* cited by examiner

Primary Examiner—Stephen Chin
Assistant Examiner—Shuwang Liu
(74) Attorney, Agent, or Firm—Brian J. Wieghaus

(57) ABSTRACT

A pseudo-noise generator (516) generates an on-time component, an early component and a late component of a pseudo-noise code signal in response to an error signal. The on-time component is routed to a deinterleave and demodulate device (210) which demodulates and decodes baseband signals from received spread spectrum signals. An adder (518) subtracts the early component from the late component to form a summation signal. A multiplier (520) multiplies the summation with the received signal to form a product signal. An integrator (522) integrates the product signal to form the error signal. The error signal is fed back into the pseudo-noise generator (516) to fine tune the on-time component, the early component and the late component of the pseudo-noise code signal. As a result, a spread spectrum signal is demodulated and decoded using only one correlator (504) instead of two.

20 Claims, 4 Drawing Sheets

APPARATUS AND METHOD FOR CODE TRACKING IN AN IS-95 SPREAD SPECTRUM COMMUNICATIONS SYSTEM

BACKGROUND OF THE INVENTION

1. Field of the Invention

The present invention relates generally to apparatus and methods for communicating using spread spectrum techniques, and more particularly for communicating using spread spectrum techniques that conform to IS-95 standards.

2. Discussion of Background Art

Spread-spectrum communication systems currently find widespread use in modern cellular communications devices. Spread spectrum systems allow more users to transmit and receive communications in an ever tighter bandwidth environment.

One technique for spreading a baseband signal so as to fill an entire channel bandwidth is to mix the baseband signal with a Walsh code and a complex pseudo-noise (PN) spreading signal. The Walsh code and PN spreading signal effectively encode the baseband signal by modulating (i.e. chopping) each data symbol within the baseband signal into a number of chips having a chip period (i.e. chip interval) $T_c$, as is discussed further by Charles E. Cook and Howard S. Marsh, "*An introduction to Spread Spectrum,*" *IEEE Communications Magazine*, March 1983, and by David P. Whipple, "*The CDMA Standard*", *Applied Microwave & Wireless*, Winter 1994, pp. 24–39 (originally published as, "*North American Cellular CDMA*", *Hewlett-Packard Journal*, December 1993, pp. 90–97). The complex PN code is given by the following equation: $PN(t)=PN_I(t-\delta)+jPN_J(t-\delta)$, where $\delta$ is a phase offset. Each transmitter within a CDMA network broadcasting over the same frequency spectrum and within a range of a particular receiver is distinguishable by its unique phase offset, $\delta$. Each of the transmitters include a number of channels which are encoded and distinguished by different Walsh codes.

Current spread spectrum receivers acquire many different transmitted signals, which, while appearing to be superimposed on one another, are demodulated by correlators that are tuned to accept only transmitted channels corresponding to a particular PN code phase offset and a particular Walsh code. The receiver accomplishes this by stripping away the carrier signal and demodulating the spread spectrum signals with correlators having a matching PN code phase offset and Walsh code.

In order for demodulation to occur successfully, the transmitter's and receiver's PN spreading phase offsets must be synchronized. Delay-locked Loops (DLLs) containing correlators are commonly used to synchronize the receiver's PN code phase offset to the transmitter's PN code phase offset. However, current DLLs contain multiple correlators which add to the expense and complexity of the DLL.

What is needed is an apparatus and method for simplifying the circuitry within delay-locked loops while supporting spread spectrum communications systems conforming to the IS-95 standard.

SUMMARY OF THE INVENTION

The present invention is a spread spectrum communication receiver that is compliant with IS-95 standards and incorporates a simplified code tracking circuitry. Within the receiver, a pseudo-noise generator generates an early component and a late component of a pseudo-noise signal in response to an error signal. An adder subtracts the early component from the late component to form a summation signal. A multiplier multiplies the summation with the received signal to form a product signal. An integrator then integrates the product signal to form the error signal. The combination of these elements forms a feedback loop which modulates the pseudo-noise generator and uses only one correlator instead of two.

The method of the present invention includes the steps of receiving a spread spectrum signal, generating an early component and a late component of a pseudo-noise signal in response to an error signal, subtracting the early component from the late component to form a summation signal, multiplying the summation with the received signal to form a product signal, and integrating the product signal to form the error signal.

These and other aspects of the invention will be recognized by those skilled in the art upon review of the detailed description, drawings, and claims set forth below.

DETAILED DESCRIPTION OF THE PREFERRED EMBODIMENT

Figure 1:
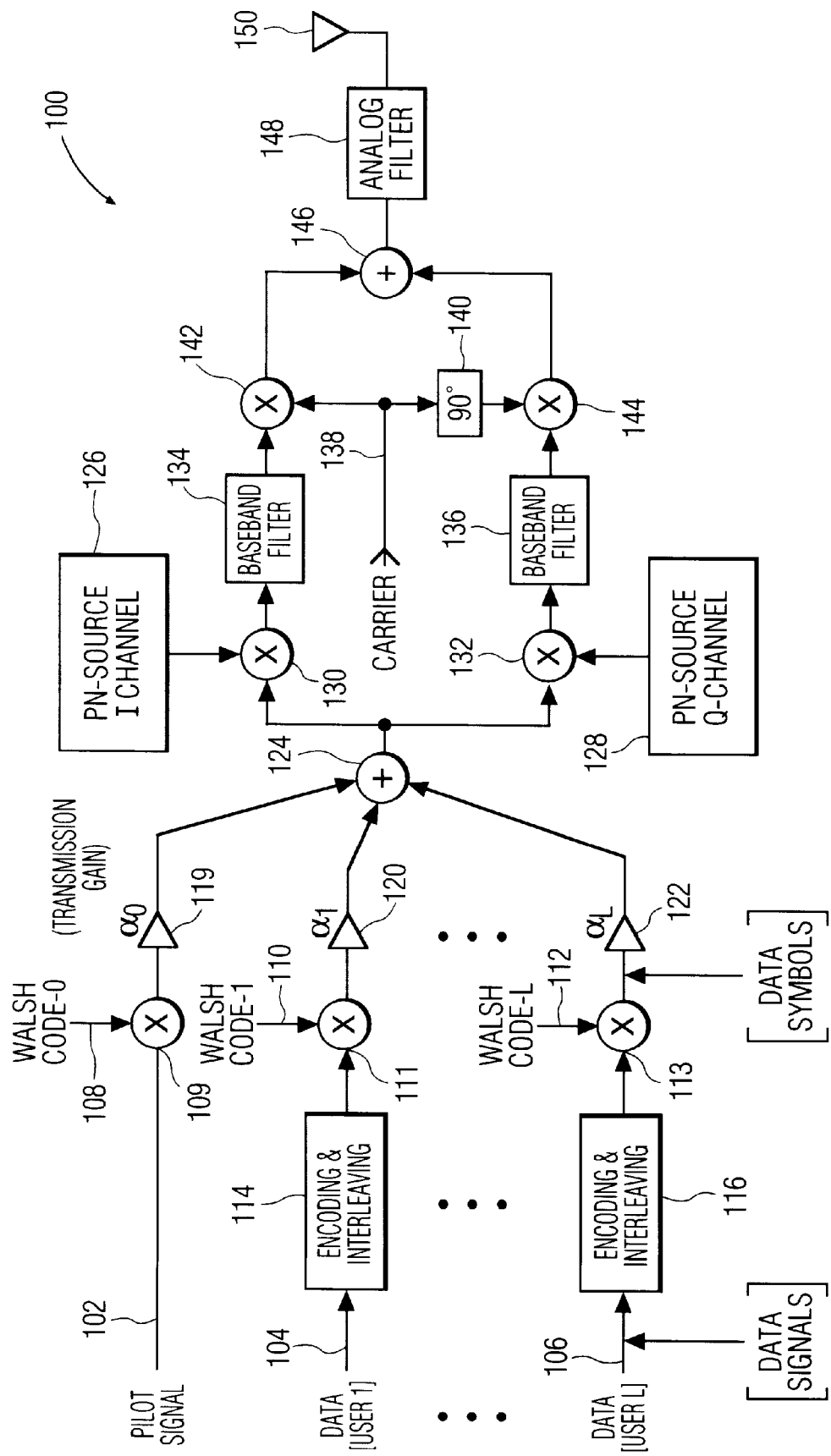
FIG. 1 is a block diagram of a portion of a CDMA spread spectrum transmitter.

FIG. 1 is a block diagram of a portion of a CDMA spread spectrum transmitter 100. The transmitter 100 includes a pilot signal on line 102, a user-1 data signal on line 104, a user-L data signal on line 106, where 'L' is an integer number, Walsh code-0 on line 108, mixer 109, Walsh code-1 on line 110, mixer 111, Walsh code-L on line 112, mixer 113, encoding & interleaving device 114, encoding & interleaving device 116, amplifier 119, amplifier 120, amplifier 122, adder 124, an I-Channel Pseudo-Noise (PN) source 126, a Q-Channel PN source 128, mixer 130, mixer 132, baseband filter 134, baseband filter 136, a carrier signal on line 138, phase shifter 140, mixer 142, mixer 144, adder 146, analog filter 148, and antenna 150. The pilot signal is unmodulated and consists of only quadrature PN codes. The pilot signal on line 102 functions as a reference signal for use by a spread spectrum receiver (see FIG. 2). The pilot signal power is set higher than all other signals in order to facilitate receiver synchronization and signal tracking.

The encoding & interleaving devices 114 through 116 are coupled to receive data signals on lines 104 through 106 respectively. The data signals are typically made up of discrete binary data bits in accordance with IS-95 standards. The encoding & interleaving devices 114 through 116 are also coupled to receive and interleave various other signals, such as sync signals, paging signals, and traffic signals, which are generated by other circuitry (not shown) within the transmitter 100. The encoding & interleaving devices 114 through 116 assign the data signals to be transmitted to either a paging signal or a traffic signal.

Mixers 109 through 113 are coupled to receive Walsh codes on lines 108, through 112 and various pilot and data signals on line 102 and from the encoding and interleaving devices 114 through 116, respectively. A different orthogonal Walsh code (i.e. Walsh code-0, Walsh code-1, through Walsh code-L), is mixed with each of these signals, uniquely spreading each of their bandwidths and defining a different channel. The Walsh codes are preferably generated by a linear shift register that produces Walsh codes having a typical period of 64 chip intervals. Orthogonal codes are defined as codes with zero cross-correlation and an auto-correlation of one. Amplifiers 118 through 120 are coupled to mixers 109 through 113 respectively and adjust the gain of each of the Walsh encoded channels. Adder 124 is coupled to amplifiers 118 through 120 and combines each of the Walsh encoded channels.

PN source 126 generates a $PN_I(t-\delta)$ component of a complex PN code and PN source 128 generates a $PN_J(t-\delta)$ component of the complex PN code. The complex PN code is denoted by the expression $PN(t)=PN_I(t-\delta)+jPN_J(t-\delta)$, where $\delta$ is a phase offset. The phase offset uniquely distinguishes the transmitter 100 from other transmitters (not shown). The PN code is generated by a linear shift register with a period of $2^{15}$ chip intervals. The resulting PN signal generated by the PN sources 126 and 128 has a 1.228 Mbps rate.

Mixers 130 and 132 are coupled to respectively receive and mix the PN signals from the PN sources 126 and 128 and the combined signal from adder 124, as shown in FIG. 1. Thus mixers 130 and 132 further encode the data symbols.

Baseband filters 134 and 136 are coupled to receive and shape the spread spectrum signals from mixers 130 and 132 respectively. Baseband filters 134 and 136 typically have 1.25 MHz bandwidths. However, by passing the spread spectrum signals through filters 134 and 136, some of the spread spectrum signal's orthogonality is sacrificed.

Mixer 142 is coupled to baseband filter 134 and line 138. Mixer 142 mixes the carrier signal on line 138 with the output of baseband filter 134. Mixer 144 is coupled to baseband filter 136 and to receive a 90° phase shifted carrier signal from the phase shifter 140. Adder 146 receives and add output signals from mixers 142 and 144, forming a combined signal. The analog filter 148 is coupled to adder 146, filtering the combined signal from adder 146. The antenna 112 is coupled to the analog filter 148 and transmits the filtered spread spectrum signal as a quadraphase PN modulated signal.

Figure 2:
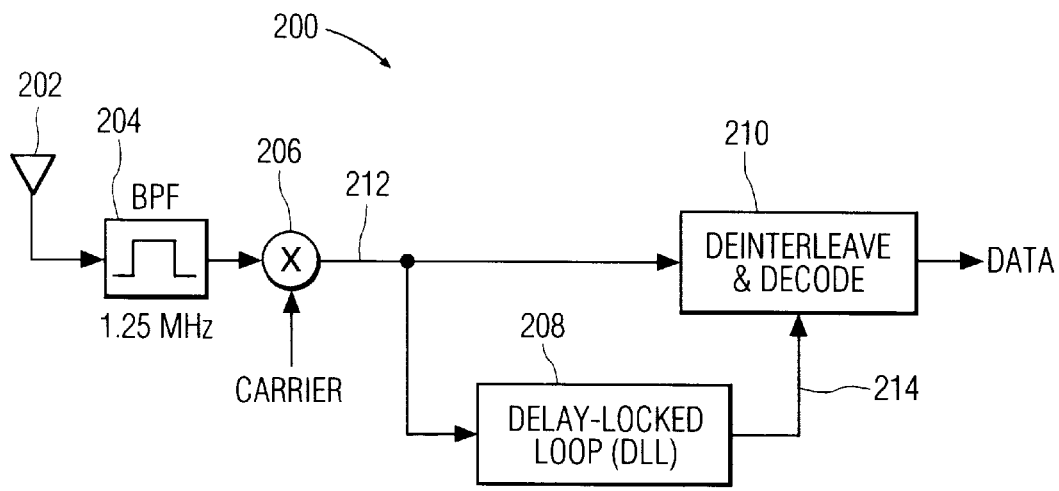
FIG. 2 is a block diagram of a portion of a CDMA spread spectrum receiver.

FIG. 2 is a block diagram of a portion of a spread spectrum receiver 200. The receiver 200 includes an antenna 202, a band pass filter 204, mixer 206, a Delay-Locked Loop (DLL) 208, and a deinterleave & decode device 210. The receiver 200 further includes other conventional circuitry which is not shown. The antenna 202 receives the spread spectrum signal transmitted by the transmitter 100. The band pass filter 204 is coupled to the antenna 202 and filters the signal. The mixer 206 is coupled to the band pass filter 204 and receives a carrier signal. The receiver's 200 carrier signal is at the same frequency as the carrier on line 138 mixed in by the transmitter 100. Mixer 206 mixes the filtered signal with the carrier, thus stripping the carrier from the spread spectrum signal. The DLL 208 and the deinterleave & decode device 210 are coupled to the mixer 206 through signal line 212.

The DLL 208 locks on to the PN code signal generated at the transmitter 100 in a process called "code tracking." Delay-locked code tracking loops can be classified as either coherent or non-coherent. The present invention uses a coherent tracking loop which makes use of the received carrier frequency and phase information so that the DLL 208 locks onto the received signal. The received signal is synchronized with a PN code generated within the DLL 208. Preferably the received signal is synchronized to within a half of a chip interval. The DLL achieves this time alignment by correlating the received signal with early and late locally generated PN codes to create an error signal. The error signal is then used in a feedback loop to adjust a PN code that is generated internally by the receiver 200. When the receiver-generated PN code is equal to the PN code transmitted by the transmitter 100, then the error signal is equal to zero, and the DLL is said to be "locked-on" to the received signal. A complete range of the error signal, when plotted, is commonly called an "S-curve."

The deinterleave & decode device 210 receives the spread spectrum signal over line 212 and the PN code signal on line 214. Using the pilot signal transmitted by the transmitter 100 as a coherent carrier reference, the deinterleave & decode device 210 further demodulates the received data signals into baseband data signals. This demodulation process includes removing the Walsh coding from the data signals. As a result, the pilot signal, the sync signals, the paging signals, the traffic signals and various other user data signals originally transmitted by the transmitter 100 are decoded and separated out.

Those skilled in the art will recognize that in a typical spread spectrum system, various other devices such as an input keyboard, a processing unit, an internal memory device, and an output display are also included within the transmitter 100 and receiver 200. The internal memory device typically stores computer program instructions for controlling how the processing unit accesses, transforms and outputs signals which control the transmitter's 100 and the receiver's 200 functions. The internal memory can be supplemented with other computer useable storage media, including a compact disk, a magnetic drive or a dynamic random access memory.

Figure 3:
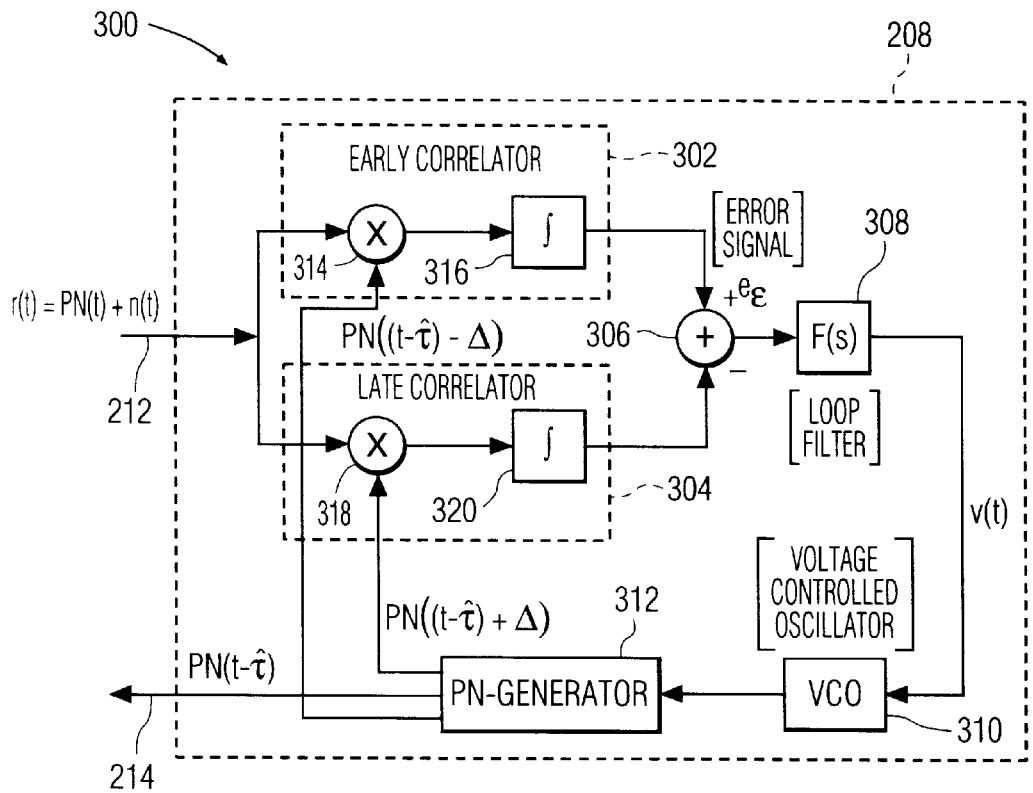
FIG. 3 is a block diagram of a Delay-Locked Loop (DLL) in the spread spectrum receiver.

FIG. 3 is a block diagram of a DLL 208 in the spread spectrum receiver 200. The DLL 208 includes an early correlator 302, a late correlator 304, a first adder 306, a loop filter 308, a Voltage Controlled Oscillator (VCO) 310 and a PN generator 312. While the terms "early" and "late" are used to label the correlators, the present invention actually operates in accordance with the mathematical equations discussed below, which take precedence. The early correlator 302 includes a first mixer 314 and a first correlator 316. The late correlator 304 includes a second mixer 318 and a second correlator 320. The early correlator 302 in the DLL 208 receives the PN encoded spread spectrum signal on line 212 and a delayed PN code from the PN generator 312. The late correlator 304 receives the PN encoded spread spectrum signal on line 212 and an advanced PN code from the PN generator 312. The late signal output from the late correlator 304 is then subtracted from the early signal output from the early correlator 302 by the adder 306 to form an error signal. The loop filter 308 receives the error signal from the adder 306. The filtered error signal is then sent to the VCO 310. The VCO 310 generates a signal from the filtered error signal which is received by the PN generator 312. In response to the error signal, the PN generator 312 fine tunes an on-time/punctual PN code signal on line 214 and the delayed and advanced PN code signals sent to the early and late correlators 302 and 304 respectively. Thus the DLL 208 loop is completed. The on-time PN code signal is sent to the deinterleave & decode device 210 for use in processing out the baseband data from the spread spectrum signal in a manner in which is conventionally known.

A more mathematical discussion of the DLL's 208 operation now follows. The spread spectrum signal, r(t), received by both the early and late correlators 302 and 304 on line 212 consists of a PN code, PN(t−$\hat{\tau}$), generated by the transmitter 100 and White Gaussian Noise (WGN), n(t), added during transmission of the signal from the transmitter's 100 antenna 112 and the receiver's 200 antenna 202, where $\hat{\tau}$ denotes the unknown transmission delay, as shown in Equation (1).

$$r(t)=PN(t-\hat{\tau})+n(t) \qquad \text{Eq. (1)}$$

It can be shown that a maximum likelihood estimate of the transmission delay $\hat{\tau}$ satisfies the equation:

$$\int_{-T/2}^{T/2} r(t)[\partial PN(t-\hat{\tau})/\partial t]dt = 0 \qquad \text{Eq. (2)}$$

where T is the period of the PN code. The maximum likelihood estimate is conventionally known in the art and is discussed in Jack K. Holmes, *Coherent Spread Spectrum Systems*, Wiley 1982 and in John G. Proakis, *Digital Communications*, $2^{nd}$ edition, McGraw-Hill 1989. In other words, Equation (2) shows that the optimum estimate of the transmission delay is obtained by correlating the received signal with the time derivative of the PN code generated by the DLL's 208 PN generator 312. The DLL's 208 delay lock tracking loop circuit then drives the correlation to zero.

In practical implementations, a discrete approximation, such as a first order difference, is used for the derivative in Equation (2). More specifically, an estimate of the correlation of the time difference between the received signal and the locally generated PN code is obtained by first multiplying, using the first multiplier 314, the received signal with the PN code which has been delayed a fraction of a chip interval, PN((t−$\hat{\tau}$)−Δ), and then integrating the result with the integrator 316 so as to create a first intermediate result. The received signal is also multiplied, using the second multiplier 318, with a PN code from the PN generator 312 that has been advanced a fraction of a chip interval, PN((t−$\hat{\tau}$)+Δ), and then integrating the result with the integrator 320 so as to create a second intermediate result. The symbol Δ refers to the fraction of a chip interval by which the PN code generated by the receiver 200 is either delayed or advanced. Typically Δ is set equal to one-half of a chip interval (i.e. $T_c/2$).

The second intermediate result is then subtracted from the first intermediate result by the adder 306 so as to generate the error signal (e). This process is referred to as early-late correlation. The error signal is passed through the loop filter 308 with the LaPlace-transform F(s) that generates a control voltage v(t) for the VCO 310 and steers the local PN generator.

With the input signal, r(t), as defined above, the error signal, e, can be written as:

$$e=[R_{PN}(t-\hat{\tau}-\Delta)-R_{PN}(t-\hat{\tau}+\Delta)]+n_{e-1}(t) \qquad \text{Eq. (3)}$$

where, $R_{PN}(.)$ denotes the autocorrelation of the PN sequence, and $n_{e-1}(.)$ is the noise out of the early and late correlators 302 and 304. The term in brackets in Equation (3) is the control signal (also known as the S-curve), and is written as:

$$S(\epsilon)=[R_{PN}(t-\hat{\tau}-\Delta)-R_{PN}(t-\hat{\tau}+\Delta)] \qquad \text{Eq. (4)}$$

where, $\epsilon=t-\hat{\tau}$.

Equation (3) can also be rewritten as:

$$e=\int r(t)PN(t-\hat{\tau}-\Delta)-\int r(t)PN(t-\hat{\tau}+\Delta)+n_{e-1}(t) \qquad \text{Eq. (5)}$$

By examining the equations above, the design of the DLL 208 becomes clear. More specifically, the early correlator 302 implements the first part of Equation (5) by using the first multiplier 314 to multiply r(t) by PN(t−$\hat{\tau}$−Δ), and the first integrator 316 to integrate the multiplied expression over a chip interval. The late correlator 304 implements the second part of Equation (5) by using the second multiplier 318 to multiply r(t) by PN(t−$\hat{\tau}$+Δ), and the second integrator 320 to integrate the multiplied expression over a chip interval. The adder 306 then subtracts the late correlator's 304 result from the early correlator's 302 result to yield the error signal. This is also known as a discrete time integrate and dump process.

Figure 4:
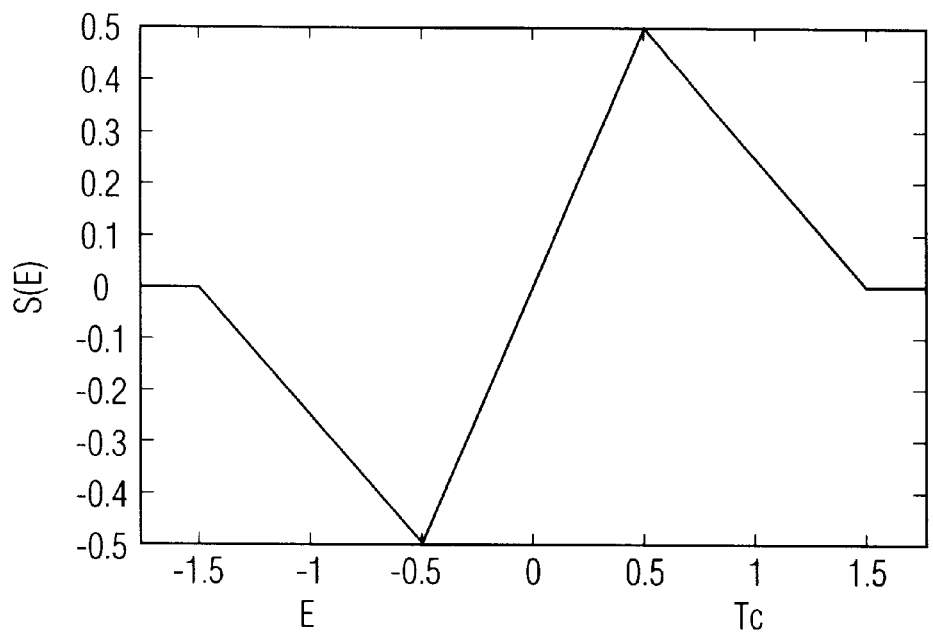
FIG. 4 is a graph of an S-curve range for the DLL.

FIG. 4 is a graph of an S-curve range, as defined in Equation (4), for the DLL 208, where $\epsilon=t-\hat{\tau}$ is the code tracking error. The S-curve characteristics and the DLL's performance are a function of a time difference between the delayed and advanced PN codes. As seen from FIG. 4, the S-curve is a non-linear function of the tracking error. The DLL 208 is designed to operate in the linear region of the S-curve, about S($\epsilon$)=0. The function of the DLL circuitry in the DLL 208 is to drive the output of the S-curve to zero. When S($\epsilon$)=0, the DLL is said to be locked.

In general, the dynamics of the tracking error and noise characteristics determine the DLL's largest bandwidth. However, the loop filter's 308 parameters are chosen so as to yield a predetermined closed loop bandwidth for the DLL which is less than the DLL's largest bandwidth. In IS-95 applications, typical tracking error dynamics result in a DLL bandwidth which is on the order of a few Hertz. However, a closed loop bandwidth of a few Hertz yields a slower DLL response. In comparison, a larger DLL bandwidth increases the DLL's tracking error. This points to a trade-off between the DLL's response time and the tracking error of the apparatus. A closed DLL bandwidth of about 100 Hz has been found to be the most suitable for IS-95 applications.

Figure 5:
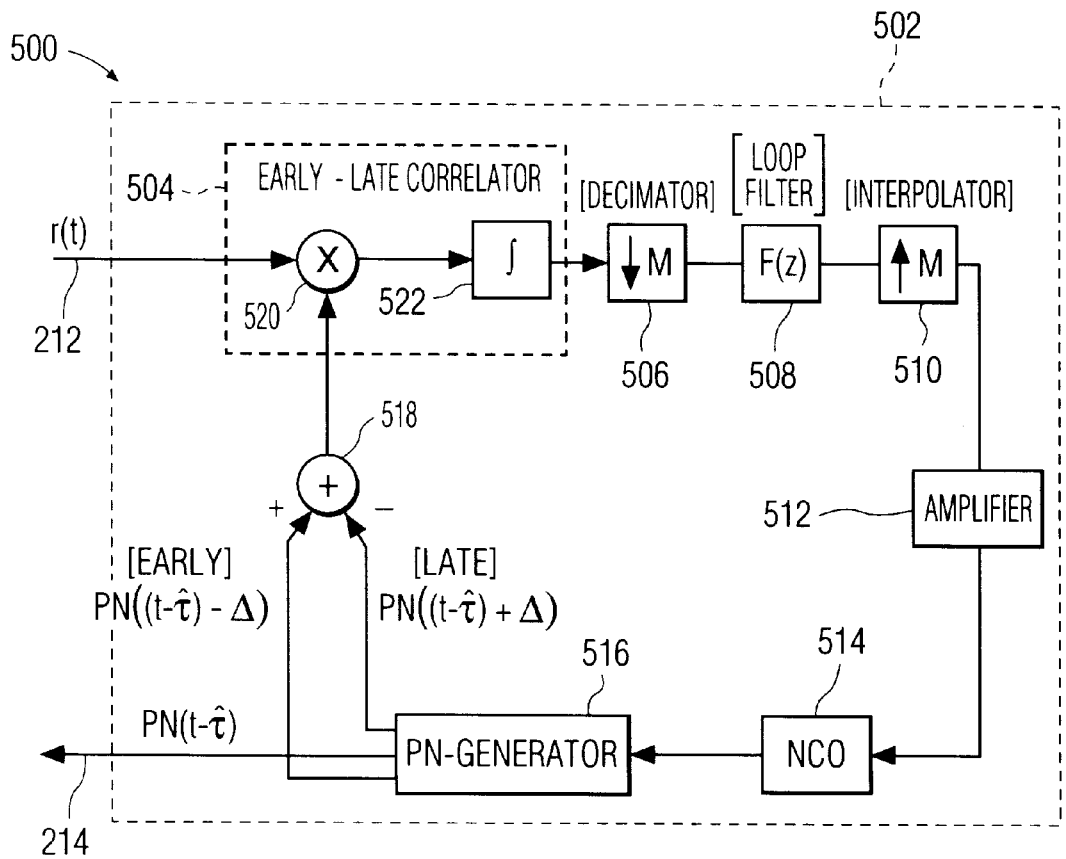
FIG. 5 is a block diagram of an alternate DLL for the spread spectrum receiver.

FIG. 5 is a block diagram of an alternate DLL 502 for the spread spectrum receiver 200. The alternate DLL 502 includes an early-late correlator 504, a decimator 506, a loop filter 508, an interpolator 510, an amplifier 512, a Numerically Controlled Oscillator (NCO) 514, a pseudo-noise (PN) generator 516, and an adder 518. The early-late correlator 504 includes a multiplier 520 and an integrator 522. Each of the above named components are coupled together as shown in FIG. 5.

Since Equation (5) is a linear equation, which can be rewritten as, $$e=\int r(t)[PN(t-\hat{\tau}-\Delta)-PN(t-\hat{\tau}+\Delta)]+n_{e-1}(t) \qquad \text{Eq. (6)}$$

FIG. 5 shows that a DLL 502 design based on Equation (6) requires only one correlator. In contrast, FIG. 3 shows that a DLL 208 design based on Equation (5) requires two separate correlators 302 and 304.

The PN generator 516 generates both a delayed PN code signal PN(t−$\hat{\tau}$−Δ) and an advanced PN code signal PN(t−$\hat{\tau}$+Δ). The adder 518 receives these PN code signals and subtracts the late PN code signal from the early PN code signal. The multiplier 520 receives the incoming receive signal r(t) and the summed result from the adder 518 which the multiplier 520 then multiplies. The integrator 522 is coupled to the multiplier 520 and integrates the resulting product over one chip interval. The decimator 506 receives the signal from the early-late correlator 504 and decimates the signal by the early-late correlator's accumulation length. This accumulation length is equal to a predetermined number of symbols. A symbol is preferably equal to 64 chips, and each chip is defined by a predetermined number of samples.

The loop filter 508 is coupled to the decimator 506 and has a Z transfer function defined as F(z). The loop filter 508 is able to shape the output of the decimator 506 at a lower rate than would otherwise be possible without the decimator 506. The interpolator 510 receives the output of the loop filter 508 which is then interpolated by the number of accumulation length samples. Decimators and interpolators are conventionally known in the art and are discussed in John G. Proakis, *Digital Communications, 2<sup>nd</sup>* edition, McGraw-Hill 1989 and in J. G. Proakis & D. G. Manolakis, *Digital Signal Processing Principles, Algorithms, and Applications, 2<sup>nd</sup>* edition, Macmillan 1992. The NCO 514 receives the signal from the interpolator 510 and adjusts the timing of the PN generator 516. The PN generator 516 receives the signal from the NCO 514 which updates the PN generator's 516 transmission delay estimate, $\hat{\tau}$, during every accumulation period. The PN generator 516 also outputs the on-time PN code signal on line 214.

Figure 6:
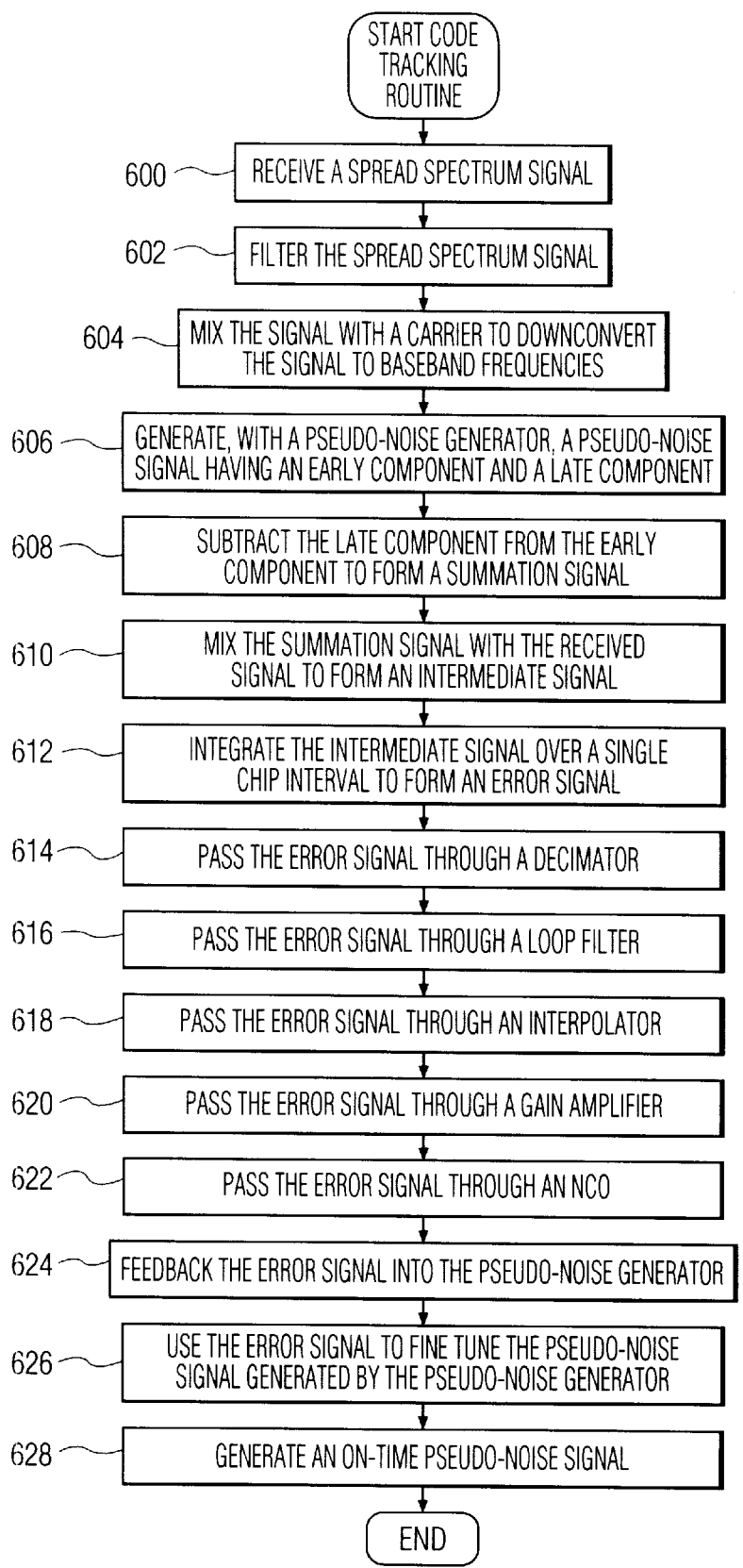
FIG. 6 is a flowchart of a method for code tracking in an IS-95 spread spectrum communications system.

FIG. 6 is a flowchart of a method for code tracking in an IS-95 spread spectrum communications system. The method begins in step 600 where the antenna 202 receives a spread spectrum signal. Next, in step 602, the band pass filter 204 filters the spread spectrum signal. In step 604, the mixer 206 mixes the signal with a carrier to downconvert the signal to baseband frequencies. In step 606, the pseudo-noise generator 516 generates a pseudo-noise signal having an early component and a late component. Next in step 608, the adder 518 subtracts the early component from the late components to form a summation signal. In step 610, the mixer 520 mixes the summation signal with the received signal to form an intermediate signal. In step 612, the integrator 522 integrates the intermediate signal over a predetermined number of symbols to form an error signal. The number of symbols is dependent upon a variety of factors such as tolerable noise levels, doppler rates, as well as other performance criteria known in the art. In step 614, the error signal is passed through the decimator 506. In step 616, the error signal is passed through the loop filter 508. In step 618, the error signal is passed through the interpolator 510. In step 620, the error signal is passed through the gain amplifier 512. In step 622, the error signal is passed through the NCO 514. Next in step 624, the PN generator 516 receives the error signal from the NCO 514, thus completing the feedback loop/delay-locked loop. In step 626, the PN generator 516 uses the error signal to fine tune the early and late components of the PN code signal. In step 628, the PN generator 516 outputs an on-time PN code signal for use by the deinterleave & decode device 210 to demodulate and decode baseband signals from the received spread spectrum signal. After step 628, the method is complete.

While the present invention has been described with reference to a preferred embodiment, those skilled in the art will recognize that various modifications may be made. Variations upon and modifications to the preferred embodiment are provided by the present invention, which is limited only by the following claims.

What is claimed is:

1. An apparatus for code tracking in a spread spectrum communications system, the apparatus comprising:
   a receiver that is configured to demodulate a received signal, the receiver including:
      a pseudo-noise generator for generating an early component and a late component of a pseudo-noise signal in response to an error signal;
      an adder, coupled to the pseudo-noise generator, that is configured to subtract the late component from the early component to form a difference signal;
      a signal correlator that includes:
         a multiplier, coupled to the adder, that is configured to multiply the difference signal with the received signal to form a product signal that is based on the difference signal and the received signal only; and
         an integrator, coupled to the multiplier, that is configured to integrate the product signal to form the error signal based on the product signal only.

2. The apparatus of claim 1 further comprising a decimator, coupled to the integrator, that is configured to decimate the error signal.

3. The apparatus of claim 1 further comprising a loop filter, coupled to the integrator, that is configured to filter the error signal.

4. The apparatus of claim 1 further comprising an interpolator, coupled to the integrator, that is configured to interpolate the error signal.

5. The apparatus of claim 1 further comprising an amplifier, coupled to the integrator, that is configured to amplify the error signal.

6. The apparatus of claim 1 further comprising an NCO, coupled to the integrator, that is configured to interface the error signal with the pseudo-noise generator.

7. A method for code tracking in a spread spectrum communications system, comprising:
   receiving a spread spectrum signal;
   generating an early component and a late component of a pseudo-noise signal in response to an error signal;
   subtracting the late component from the early component to form a difference signal;
   multiplying the difference signal with the received signal to form a product signal that is based on the difference signal and the received signal only; and
   integrating the product signal to form the error signal based on the product signal only.

8. The method of claim 7 further including
   decimating the error signal before generating the early component and the late component of the pseudo-noise signal.

9. The method of claim 7 further including
   filtering the error signal before generating the early component and the late component of the pseudo-noise signal.

10. The method of claim 7 further including
    interpolating the error signal before generating the early component and the late component of the pseudo-noise signal.

11. An apparatus for code tracking in a spread spectrum communications system, comprising:
    means for receiving a spread spectrum signal;
    means for generating an early component and a late component of a pseudo-noise signal in response to an error signal;
    means for subtracting the late component from the early component to form a difference signal;
    means for multiplying the difference signal with the received signal to form a product signal that is based on the difference signal and the received signal only; and
    means for integrating the product signal to form the error signal based on the product signal only.

12. The apparatus of claim 11 further including
    means for decimating the error signal.

13. The apparatus of claim 11 further including means for filtering the error signal.

14. The apparatus of claim 11 further including means for interpolating the error signal.

15. A computer-useable medium embodying computer program code for causing a computer to perform code tracking in a spread spectrum communications system by:
  receiving a spread spectrum signal;
  generating an early component and a late component of a pseudo-noise signal in response to an error signal;
  subtracting the late component from the early component to form a difference signal;
  multiplying the difference signal with the received signal to form a product signal that is based on the difference signal and the received signal only; and
  integrating the product signal to form the error signal based on the product signal only.

16. The computer-useable medium of claim 15, wherein the computer is further caused to perform code tracking by
  decimating the error signal before generating the early component and the late component of the pseudo-noise signal.

17. The computer-useable medium of claim 15, wherein the computer is further caused to perform code tracking by
  filtering the error signal before generating the early component and the late component of the pseudo-noise signal.

18. The computer-useable medium of claim 15, wherein the computer is further caused to perform code tracking by
  interpolating the error signal before generating the early component and the late component of the pseudo-noise signal.

19. A spread-spectrum communications system comprising:
  a receiver that is configured to provide a received signal corresponding to a transmitted signal having a transmit phase,
  a differential device that is configured to provide a difference signal based on an early pseudo-noise signal and a late pseudo-noise signal,
  a correlation device that is configured to provide an error-signal based on a correlation between the received signal and the difference signal only,
  a pseudo-noise generator that is configured to provide the early and late pseudo-noise signals based on the error-signal so as to provide a receiver pseudo-noise signal that is in phase with the transmit phase.

20. The spread-spectrum communications system of claim 19, further including:
  a decimator that is configured to decimate the error-signal to provide a decimated error-signal,
  a filter that is configured to filter the decimated error-signal to provide a filtered error-signal, and
  an interpolator that is configured to interpolate the filtered error-signal to provide an interpolated error-signal, and wherein,
  the pseudo-noise generator is configured to provide the early and late pseudo-noise signals based on the interpolated error-signal.

* * * * *